(12) United States Patent
Maeda et al.

(10) Patent No.: US 8,870,498 B2
(45) Date of Patent: Oct. 28, 2014

(54) BALL END MILL

(75) Inventors: Kazuo Maeda, Itami (JP); Kouji Tominaga, Itami (JP)

(73) Assignee: Sumitomo Electric Hardmetal Corp., Hyogo (JP)

( * ) Notice: Subject to any disclaimer, the term of this patent is extended or adjusted under 35 U.S.C. 154(b) by 572 days.

(21) Appl. No.: 13/125,916

(22) PCT Filed: Oct. 21, 2009

(86) PCT No.: PCT/JP2009/068101
§ 371 (c)(1),
(2), (4) Date: Apr. 25, 2011

(87) PCT Pub. No.: WO2010/050391
PCT Pub. Date: May 6, 2010

(65) Prior Publication Data
US 2011/0211922 A1    Sep. 1, 2011

(30) Foreign Application Priority Data

Oct. 29, 2008  (JP) .................................. 2008-277991

(51) Int. Cl.
*B23C 5/10*   (2006.01)
(52) U.S. Cl.
CPC ....... *B23C 5/1009* (2013.01); *B23C 2210/0407* (2013.01); *B23C 2210/0414* (2013.01); *B23C 2210/0421* (2013.01)
USPC ................. 407/54; 407/53; 407/61; 407/62

(58) Field of Classification Search
CPC ....................................................... B23C 5/10
USPC ............ 407/30, 34, 35, 42, 43, 53, 54, 61–63
See application file for complete search history.

(56) References Cited

U.S. PATENT DOCUMENTS 5,322,394 A * 6/1994 Okanishi et al. ................ 407/32
5,855,458 A * 1/1999 Reynolds et al. ............... 407/54
(Continued)

FOREIGN PATENT DOCUMENTS

DE    11 2005 000 799 T5    2/2007
DE        198 24 212 B4    11/2007
(Continued)

OTHER PUBLICATIONS

International Search Report for PCT/JP2009/068101, dated Jan. 12, 2010, pp. 1-6.
(Continued)

*Primary Examiner* — Andrea Wellington
*Assistant Examiner* — Sara Addisu
(74) *Attorney, Agent, or Firm* — Ditthavong & Steiner, P.C.

(57) ABSTRACT

A ball end mill in which a ball end cutting edge (3) has a convex shape in a tool rotation direction with respect to a line connecting a rotation center (O) and a radially outer end (3o) of the ball end cutting edge (3), in a front view of the tool. In the ball end mill, a rake angle (γ) of each portion of the ball end cutting edge (3) is set in a range from −10° to 0°, and the negative value of the rake angle (γ) is increased from a tip of the ball end cutting edge (3) and a radially outer end (3o) of the ball end cutting edge (3) toward a middle point in the radial direction, and is maximized at approximately the middle point in the radial direction.

6 Claims, 4 Drawing Sheets

(56) References Cited

U.S. PATENT DOCUMENTS

| | | | |
|---|---|---|---|
| 6,082,935 A | 7/2000 | Hori | |
| 6,846,135 B2* | 1/2005 | Kuroda et al. | 407/53 |
| 6,953,310 B2* | 10/2005 | Iwamoto et al. | 407/54 |
| 7,402,004 B2* | 7/2008 | Tanaka et al. | 407/53 |
| 7,878,739 B2* | 2/2011 | Maeda | 407/119 |
| 8,690,492 B2* | 4/2014 | Azegami | 407/53 |
| 2003/0198525 A1* | 10/2003 | Iwamoto et al. | 407/54 |
| 2005/0025584 A1* | 2/2005 | Kolker et al. | 407/54 |
| 2006/0045639 A1* | 3/2006 | Flynn et al. | 407/54 |
| 2013/0051937 A1* | 2/2013 | Volokh et al. | 407/42 |

FOREIGN PATENT DOCUMENTS

| | | |
|---|---|---|
| JP | 8-168914 A | 7/1996 |
| JP | 2000-233311 A | 8/2000 |
| JP | 2001-9624 A | 1/2001 |
| JP | 2001-341026 A | 12/2001 |
| JP | 2003-71625 A | 3/2003 |
| JP | 2003-225821 A | 8/2003 |
| JP | 2004-74329 A | 3/2004 |
| JP | 2004141975 A * | 5/2004 |
| JP | 3833875 B2 | 7/2006 |
| JP | 2008-110437 A | 5/2008 |
| WO | WO 2005/102572 A1 | 11/2005 |
| WO | WO 2010/050391 A1 | 5/2010 |

OTHER PUBLICATIONS

German Office Action for German Patent Application No. 112009002613.3 dated Feb. 7, 2012, pp. 1-7.

* cited by examiner

BALL END MILL

TECHNICAL FIELD

The present invention relates to a ball end mill used for cutting metals. In particular, the present invention relates to a ball end mill which realizes smooth cutting and smooth removal of chips to prolong its tool life and minimize the roughness of a machined surface.

BACKGROUND ART

End mills, which are made of high-hardness materials such as cemented carbide and therefore are suitable for cutting of high-hardness materials and high-speed cutting, are increasing. Ball end mills are one kind of such end mills. A cutting edge of a ball end mill made of a high-hardness material is more likely to be chipped than that of a ball end mill made of high-speed steel or the like. Therefore, the chipping resistance of a ball end cutting edge at the tip and the chip removal performance are improved to prolong the tool life or improve the roughness of a machined surface. For example, Patent Literature 1 to 3 disclose such ball end mills.

Patent Literature 1 discloses a ball end mill, in which two ball end cutting edges of a two-flute end mill are arranged over the center core of the end mill, and thereby a chisel edge (chisel blade) having a specified length is provided in the rotation center.

In this ball end mill, the length of the chisel edge is specified to increase the ratio of a flute existing anterior to the chisel edge, thereby improving the chip removal performance.

Patent Literature 2 discloses a ball end mill, in which two ball end cutting edges of a two-flute end mill are arranged over the center core of the end mill, and a chisel edge having a limited chisel angle is provided in the rotation center. In this ball end mill, since each ball end cutting edge is arranged over the center core, the thickness of the edge at the nose section is increased, and thereby the edge in the rotation center is strengthened. Further, since the chisel angle of the chisel edge positioned in the rotation center is limited, chips produced by cutting with the chisel edge are favorably removed.

Also in a ball end mill disclosed in Patent Literature 3, two ball end cutting edges of a two-flute end mill are arranged over the center core of the end mill, and a chisel edge is provided in a rotation center. In this ball end mill, an inner end of each ball end cutting edge is extended to the other ball end cutting edge side beyond the rotation center of the tool, and thus so-called plunging is allowed.

The ball end mills disclosed in Patent Literature 1 to 3 are identical in that the ball end cutting edges are arranged over the center core, the inner end of each ball end cutting edge is extended to the other ball end cutting edge side beyond the rotation center of the tool, and the chisel edge is provided in the rotation center.

Patent Literature 1: Japanese Patent No. 3833875
Patent Literature 2: Japanese Laid-Open Patent Publication No. 2000-233311
Patent Literature 3: Japanese Laid-Open Patent Publication No. 2001-9624

SUMMARY OF THE INVENTION

Problems to be Solved by the Invention

In the ball end mills disclosed in Patent Literature 1 to 3, since the inner end of each ball end cutting edge is extended to the other ball end cutting edge side beyond the rotation center of the tool, a gash (flute) in the rotation center is increased. Thus, the chip removal performance at the rotation center is improved. Further, since each ball end cutting edge is shaped so that its inner end extends beyond the rotation center, the ball end mill is allowed to perform so-called plunging.

In the ball end mills disclosed in Patent Literature 1 to 3, improvement of the chip removal performance can be expected if the depth of cut is shallow. However, under the condition of deep milling, the thickness of chips increases, and therefore, the chips do not flow smoothly along the narrow gash at the rotation center, resulting in a problem of chip clogging.

Particularly when plunging is executed, thick chips are produced also in the rotation center, and therefore, smooth removal of chips from the narrow gash cannot be expected.

Further, in any of the ball end mills, the ball end cutting edges are arranged over the center core. Therefore, particularly when plunging is performed, the cutting force (thrust) is strong and thereby vibration is likely to occur, which makes it difficult to ensure stable processing.

The inventors have sought solutions to these problems, and discovered a structure, which is more effective for improvement of chip removal performance and reduction in cutting resistance than the structures disclosed in Patent Literature 1 to 3 and the like.

The present invention has an object to provide the above-described structure of a ball end mill to realize smooth removal of chips and stable cutting with reduced cutting resistance by the ball end mill, and simultaneously, to strengthen cutting edges.

Solution to the Problems

In order to solve the above-described problems, in the present invention, a rake angle γ of each of portions of a ball end cutting edge of a ball end mill, which ball end cutting edge has a shape of an arc of approximately a quarter circle, is set in a range from −10° to 0°, and the negative value of the rake angle γ is increased from a tip of the ball end cutting edge and a radially outer end of the ball end cutting edge toward a middle point of the quarter circle, and is maximized at approximately a middle point of the quarter circle, and moreover, the ball end cutting edge has a convex shape in a tool rotation direction with respect to a line connecting a rotation center and the radially outer end of the ball end cutting edge, in a front view of the tool.

Here, the tip of the ball end cutting edge is the rotation center. The rake angle of each portion of the ball end cutting edge is a rake angle in a cross section along a radial direction from the center of the arc of the ball end cutting edge. Further, the middle point of the quarter circle of the ball end cutting edge indicates a point where the quarter circle intersects with a straight line which radially extends from the center of the arc of the ball end cutting edge and turns at an angle of α (=45°) from the axis of the tool, in the plan view where the ball end cutting edge appears as approximately a quarter circle (refer to FIG. 1, which is a view along direction X in FIG. 3).

If the ball end mill is configured as a two-flute end mill, the ball end mill preferably has the following configuration. That is, an inner end of each of two ball end cutting edges arranged at centrally symmetric positions is extended to the other ball end cutting edge side beyond the rotation center of the tool. Further, a first gash and a second gash are provided in the center of the tool. In the front view of the tool, the first gash is extended to a position beyond the rotation center along the inner end side of each ball end cutting edge, and the second gash is adjacent to the first gash and is extended to the other ball end cutting edge side beyond the first gash.

It is preferred that the rake angle γ in the vicinity of the radially outer end of the ball end cutting edge be set at 0° or a negative angle, and a rake angle γ1 of a peripheral cutting edge connecting to the radially outer end of the ball end cutting edge be set at a positive angle, and thereby a flute along the peripheral cutting edge be shaped to have a concavely curved surface in a cross-sectional view at right angle to the axis of the end mill. It is preferred that a core thickness of a part excluding a tip and its vicinity be set at 0.2 to 0.5 D, with D being an effective diameter of the end mill, and a length, in the axial direction of the tool, of an area where the rake angle γ in the vicinity of the radially outer end of the ball end cutting edge is set at 0" or a negative angle, be equal to or shorter than 0.1 D.

Effects of the Invention

In the ball end mill of the present invention, the rake angle γ of each of portions of a ball end cutting edge is set in a range from −10" to 0" (negative), and the negative value of the rake angle γ is maximized at approximately a middle point of the quarter circle of the ball end cutting edge. Therefore, the approximately middle point of the quarter circle of the ball end cutting edge is strengthened at maximum.

In the ball end mill, a portion of the ball end cutting edge, from its radially inner end to approximately the center of the quarter circle, tends to be used frequently. Accordingly, the strength of the cutting edge can be effectively increased by strengthening the middle point of the quarter circle and its vicinity, which has the highest cutting speed in the above-mentioned range.

Since deterioration of edge sharpness is reduced by increasing the rake angle at the radially inner end side where the cutting speed is low, excellent cutting performance is ensured.

Further, since the ball end cutting edge has a convex shape in the tool rotation direction with respect to the line connecting the rotation center and the radially outer end of the ball end cutting edge in the front view of the tool, chips are easily guided toward the rotation center. This function facilitates chip removal, and thus stable cutting and smooth cutting with less flaws on a machined surface can be expected.

Figure 3:
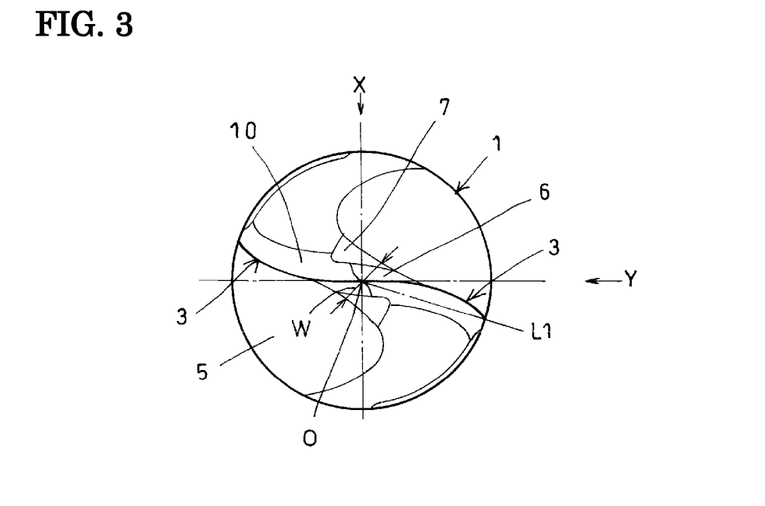
FIG. 3 is a front view of the ball end mill shown in FIG. 1.

Further, since the rake angle γ of each portion of the ball end cutting edge is varied from the radially inner or outer end of the ball end cutting edge toward the middle point of the quarter circle (i.e., the negative value is increased), the rake face along the ball end cutting edge has a convexly curved surface in a view (lateral view) along direction Y in FIG. 3. This shape of the rake face also improves the chip flow characteristics.

Also the preferred configurations described above, improved chip removal performance and reduced cutting resistance can be expected. This point will be described later in detail.

DESCRIPTION OF THE REFERENCE CHARACTERS 1 main body
2 shank
3 ball end cutting edge
3i inner end
3o outer end.
4 peripheral cutting edge
5 flute
6 first gash
7 second gash
8 chisel edge
9 rake face
10 flank face
O rotation center
α angle from a tool axis to a line connecting an arc center of a ball end cutting edge and a middle point of a quarter circle
γ rake angle
θ clearance angle

BEST MODE FOR CARRYING OUT THE INVENTION

Figure 1:
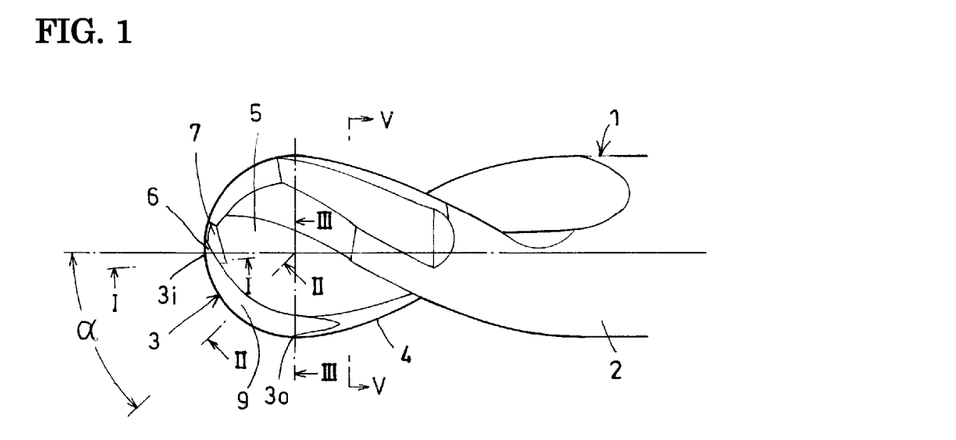
FIG. 1 is a plan view illustrating a major part of an embodiment of a ball end mill according to the present invention.
Figure 2:
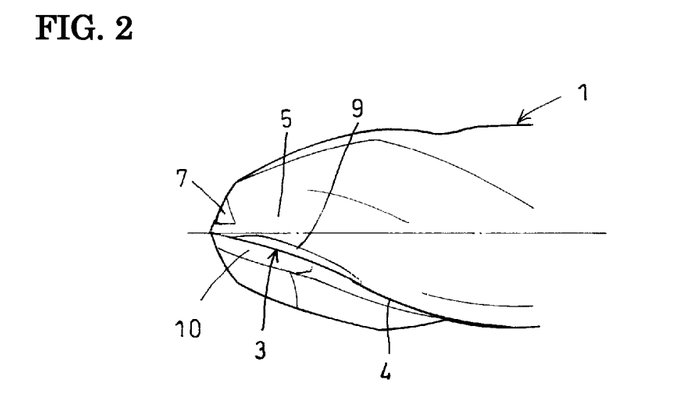
FIG. 2 is a lateral view illustrating the ball end mill shown in FIG. 1 which is turned at 90°.

Hereinafter, a ball end mill according to the present invention will be described with reference to FIGS. 1 to 7 in the attached drawings. FIGS. 1 to 3 illustrate major parts of an embodiment of a ball end mill. The exemplified ball end mill is a two flute coated carbide solid ball end mill, in which a main body 1 and a shank 2 are integrally formed of cemented carbide.

Provided at the tip of the main body 1 are: two ball end cutting edges 3, helical peripheral cutting edges 4 connecting to radially outer ends of the respective ball end cutting edges; flutes 5 extending along the respective edges; and first and second gashes 6 and 7 connecting to the front ends of the respective flutes.

The two ball end cutting edges 3 are arranged symmetrically with respect to the rotation center. Likewise, the peripheral cutting edges 4, the flutes 5, and the first and second gashes 6 and 7 are respectively arranged symmetrically with respect to the rotation center.

Each of the ball end cutting edges 3 has a shape of an arc of approximately a quarter circle. In the front view of the tool shown in FIG. 3, the ball end cutting edge 3 protrudes in the tool rotation direction with respect to a line L1 connecting a rotation center O and a radially outer end 3o of the ball end cutting edge.

A chisel edge 8 is provided in the rotation center. Each ball end cutting edge 3 connects to the chisel edge 8 and extends radially outward from the position of the chisel edge 8.

Figure 4A:
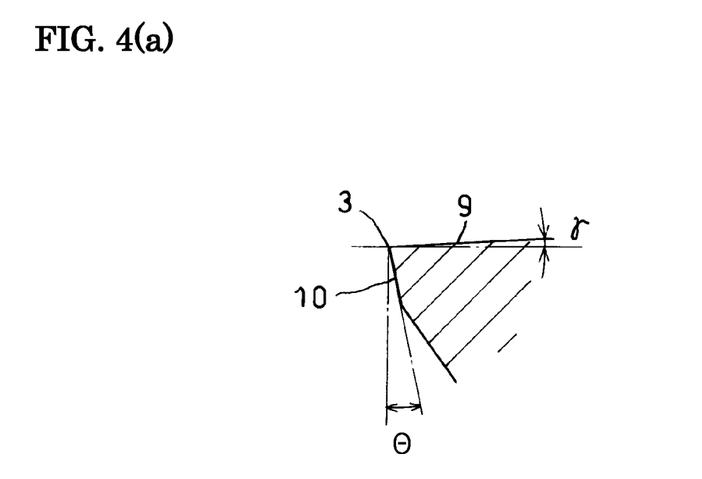
FIG. 4(a) is an enlarged cross-sectional view taken along a line I-I in FIG. 1.
Figure 4B:
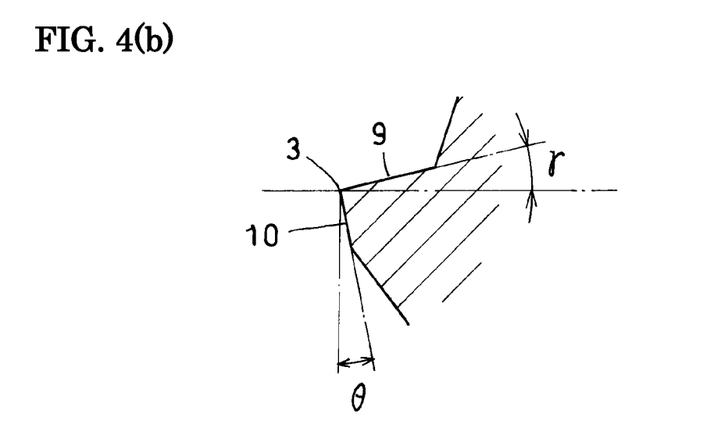
FIG. 4(b) is an enlarged cross-sectional view taken along a line II-II in FIG. 1.
Figure 4C:
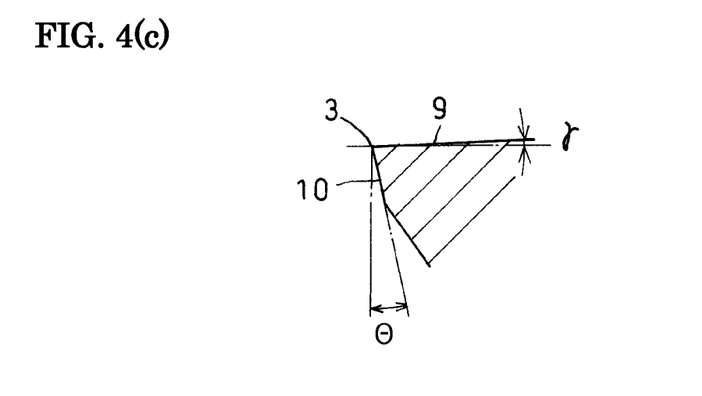
FIG. 4(c) is an enlarged cross-sectional view taken along a line III-III in FIG. 1.

FIGS. 4(a) to 4(c) are cross-sectional views of portions of the ball end cutting edge 3, taken along lines I-I, II-II, and III-III in FIG. 1, respectively. In these Figs., reference numerals 9 and 10 denote a rake face and a flank face of the ball end cutting edge 3, respectively. As seen from these Figs., the rake angle γ of the ball end cutting edge 3 is set at different values depending on the portions of the ball end cutting edge 3.

The rake angle γ is set in a range from −10° to 0°. The negative value of the rake angle γ increases from the tip of the ball end cutting edge (the connection point between the ball end cutting edge and the chisel edge 8) and the radially outer end 3o of the ball end cutting edge toward the middle point of the quarter circle, and is maximized at approximately a middle point of the quarter circle (at a point where angle α is 45°). For example, the rake angle γ is set at −3" in the position of line I-I in FIG. 1, at −7° in the position of line II-II, and at −3° in the position of line III-III.

Since the rake angle γ is thus varied at the respective portions of the ball end cutting edge 3, a convexly curved rake face 9 is formed along the ball end cutting edge 3, in the plan view (FIG. 2) which is a view along direction Y in FIG. 3. The middle point of the quarter circle of the ball end cutting edge, which is frequently used, is strengthened at maximum by the convexly curved rake face 9, and furthermore, the effect of guiding chips toward the rotation center is enhanced in the vicinity of the rotation center. Further, since the inclination of the flute 5 with respect to the tool axis increases at the radially outer side beyond the middle point of the quarter circle of the ball end cutting edge, the same situation as where the helix angle of the flute is substantially increased is produced. Although the chip removal force is usually reduced with a distance from the cutting edge, the above-described structure causes a great chip removal force to be applied to the chips, thereby improving the chip removal performance.

The clearance angle θ of the flank face 10 is constant at the respective portions of the ball end cutting edge 3. The clearance angle θ may be an angle that is typically adopted for ball end mills.

Figure 6:
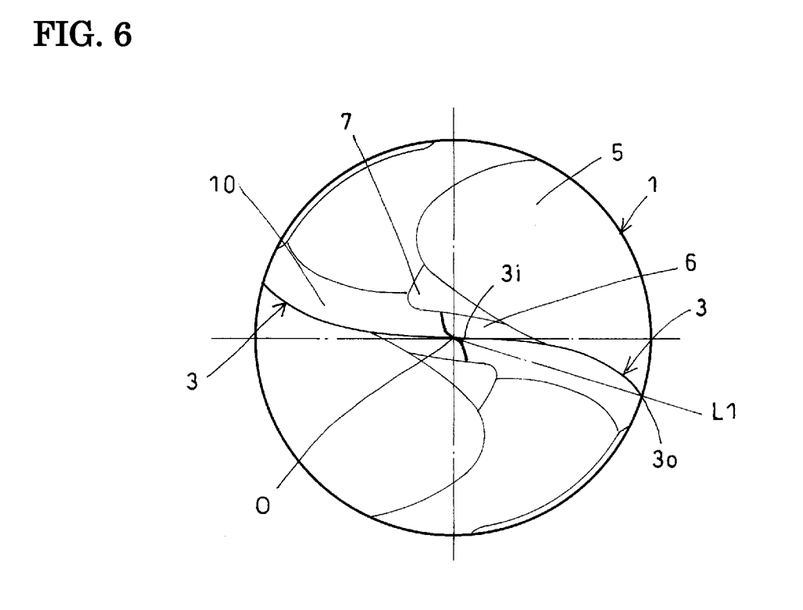
FIG. 6 is an enlarged view of FIG. 3.

As shown in FIG. 6, a radially inner end 3i of each ball end cutting edge 3 is extended to the other ball end cutting edge side beyond the rotation center O of the end mill at the center of the tool, and thereby the inner ends 3i of the ball end cutting edges 3 overlap with each other in the rotation center, in the front view of the tool. The first gash 6 is arranged in the center of the tool along the inner end side portion of the ball end cutting edge including the inner end 3i. The first gash 6 is also extended to the other ball end cutting edge side beyond the rotation center O.

Further, the second gash 7 is arranged adjacent to the first gash 6, in the center of the tool. The second gash 7 is also extended to the other ball end cutting edge side beyond the first gash 6.

As described above, the inner ends of the ball end cutting edges 3 overlap with each other in the rotation center, and the chisel edge is arranged in the center of the tool. Then, the shape of the rotation center is approximated to the shape of a drill, which allows the ball end mill to perform plunging with cutting feed in the axial direction.

Further, since the second gash 7 is arranged adjacent to the first gash 6, the width of the gash part arranged in the center of the tool is increased. Thereby, flow of chips in the rotation center is smoothened, resulting in improved chip removal performance in high-feed-rate cutting or plunging. In this way, the amount of extension of the second gash 7 to the other ball end cutting edge side is greater than that of the first gash 6 and thereby the gash part is expanded. Therefore, reduction in the strength of the cutting edges at the rotation center due to the expansion of the gash part is not considerable.

Figure 5:
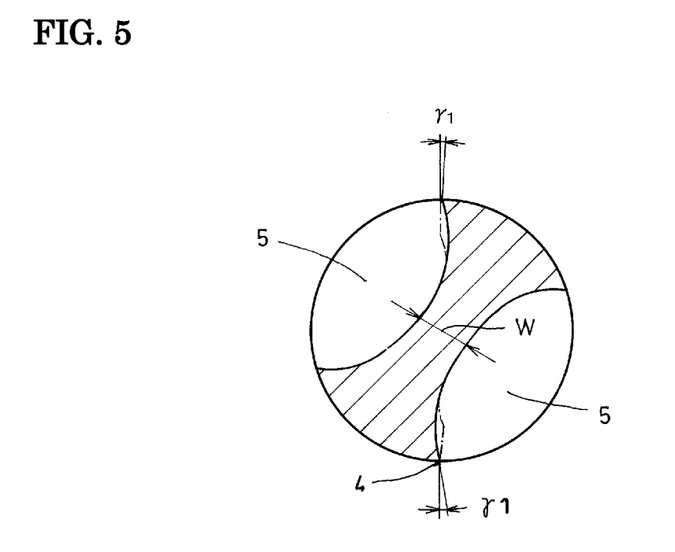
FIG. 5 is an enlarged cross-sectional view taken along a line V-V in FIG. 1.

The rake angle γ in the vicinity of the radially outer end of the ball end cutting edge 3 is set at 0° or a negative value (refer to a dot-dash line in FIG. 5). Further, as shown by the dot-dash line in FIG. 5, the flute 5 along the peripheral cutting edge 4 whose rake angle γ1 is set at a positive angle is shaped so as to have a concavely curved surface in the cross-sectional view (FIG. 5) at right angle to the axis of the end mill. Since the flute 5 is thus shaped, the function of guiding chips toward the rotation center is enhanced, and thus the chip removal performance is further improved.

The core thickness W (refer to FIG. 5) of a part excluding the tip and its vicinity is preferably in a range from 0.2 to 0.5 D.

Further, the length of an area, in the tool axis direction, where the rake angle γ in the vicinity of the radially outer end of the ball end cutting edge 3 is set at 0° or a negative angle, is preferably equal to or shorter than 0.1 D. A ball end mill that satisfies these requirements can ensure a sufficient depth of the flute 5 while maintaining the required strength. Further, since the length, in the tool axis direction, of the area where the force of guiding chips toward the rotation center is not strong because the rake angle is less than 0°, is reduced, further improvement of the chip removal performance can be expected.

FIG. 6 is an enlarged view of the front view shown in FIG. 3. As seen from FIG. 6 and FIG. 7 which is an enlarged view of the rotation center part shown in FIG. 6, each ball end cutting edge 3 is arranged so that the thickness thereof on the center core is approximately 0, and connects to the chisel edge 8 at the rotation center. By setting the thickness of each ball end cutting edge on the center core as small as possible, reduction in the precision of a rotation locus that is caused by rotation of the ball end cutting edge 3, i.e., reduction in a ball R precision, is suppressed, and thus the precision of the machined surface is improved.

Figure 7:
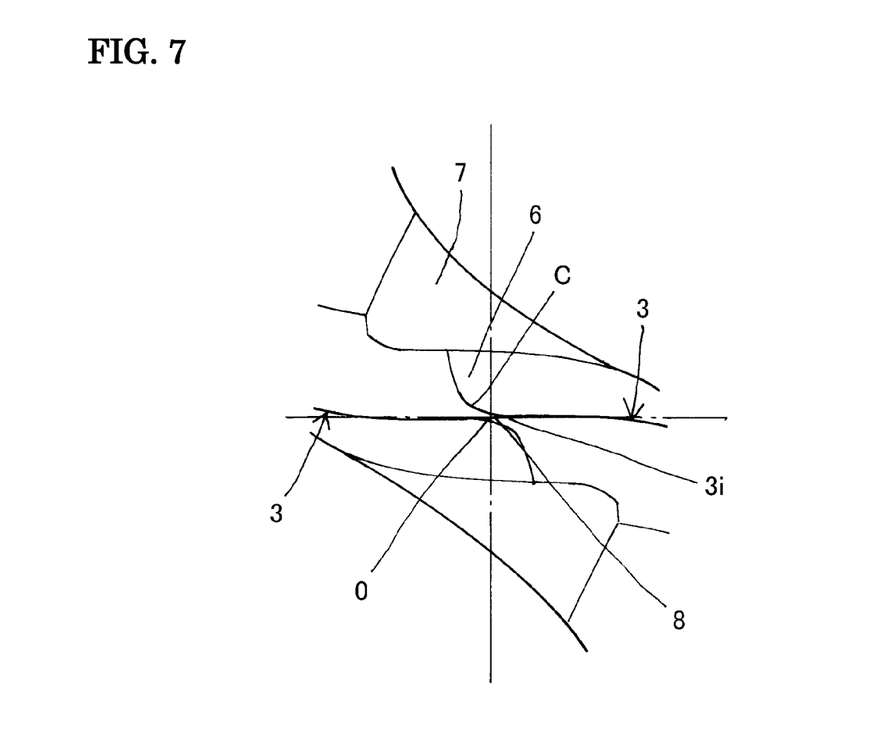
FIG. 7 is an enlarged front view illustrating cutting edges in the rotation center.

As shown in FIG. 7, the radially inner end 3i of each ball end cutting edge 3 is extended to the other ball end cutting edge side beyond the rotation center O of the end mill, and thereby the inner ends 3i of the ball end cutting edges 3 overlap with each other at the rotation center in the front view of the tool. Further, a corner C between the rake face 9 of the portion that extends beyond the rotation center and the wall surface of the first gash 6 is rounded, and thereby the thickness of each ball end cutting edge 3 on the center core is made approximately 0 to cause the chisel edge 8 in the rotation center.

Although a carbide solid end mill has been described as an example, the application of the present invention is not limited to solid end mills. In addition, the material of the ball end mill is not limited to cemented carbide, coated cemented carbide, CBN, and the like.

EXAMPLE 1

Cemented carbide ball end mills (an invention product and a comparison product) each having a ball end cutting edge with a radius (R) of 5 mm were prepared. The invention product has the structure of FIG. 6, in which a first gash and a second gash are provided in the center of the tool. The comparison product has a structure in which the rake angle of each portion of the ball end cutting edge is uniformly set at 0°, and only a first gash is provided in the center of the tool.

These ball end mills were used for cutting under the following conditions.
  workpiece: NAK80 (40HRC)
Cutting Conditions
  cutting speed (Vc): 80 m/min
  feed per tooth (fz): 0.1 mat/tooth
  depth of cut (ap): 3 mm
  pick teed (pf): 1.5 mm wet cutting using a water soluble cutting fluid
machine: machining center BT40

The properties of the cutting edges were evaluated at the cutting length of 50 m.

As a result, in the invention product, each portion of the ball end cutting edge was maintained in its normal state. In contrast, in the comparison product, chipping was found at the radially middle point of the ball end cutting edge. Further, in the invention product, the chip removal performance was favorable over the entire effective edge including the rotation center. No damage of the edge was observed in the rotation center, and no flaw was observed on the machined surface. On the other hand, in the comparison product, the chip removal performance was poor, and the inner end of the ball end cutting edge and its vicinity were worn and backed in the tool rotation direction.

The invention claimed is:

1. A ball end mill including a ball end cutting edge (3) having a shape of an arc of approximately a quarter circle, wherein:
   a rake angle γ of each of portions of the ball end cutting edge (3) is set in a range from −10° to 0°,
   the negative value of the rake angle γ is increased from a tip of the ball end cutting edge (3) and a radially outer end (3o) of the ball end cutting edge (3) toward a middle point of the quarter circle, and is maximized at approximately a middle point of the quarter circle,
   the ball end cutting edge (3) has a convex shape in a tool rotation direction with respect to a line (L1) connecting a rotation center (O) and the radially outer end (3o) of the ball end cutting edge in a front view of the tool, and
   the ball end cutting edge (3) has a rake face along the ball end cutting (3) having a convexly curved surface in a view along a direction vertical to a plane where the ball end cutting edge (3) appears as approximately a quarter circle.

2. The ball end mill according to claim 1, wherein an inner end (3i) of each of two ball end cutting edges (3) of a two-flute end mill is extended to the other ball end cutting edge side beyond the rotation center (O) of the tool, the ball end mill further including:
   in the center of the tool, a first gash (6) being extended to a position beyond the rotation center (O) along the inner end side of each ball end cutting edge (3), and a second gash (7) adjacent to the first gash (6), the second gash (7) being extended to the other ball end cutting edge side beyond the first gash (6).

3. The ball end mill according to claim 2, wherein the rake angle γ in the vicinity of the radially outer end (3o) of the ball end cutting edge (3) is set at 0° or a negative angle, and a rake angle γ1 of a peripheral cutting edge (4) connecting to the radially outer end of the ball end cutting edge (3) is set at a positive angle, and thereby a flute (5) along the peripheral cutting edge (4) has a shape of a concavely curved surface in a cross-sectional view at right angle to the axis of the end mill.

4. The ball end mill according to claim 3 wherein, a core thickness (W) of a part excluding a tip and its vicinity is set at 0.2 to 0.5 D, with D being an effective diameter of the end mill, and a length, in the axial direction of the tool, of an area where the rake angle γ in the vicinity of the radially outer end of the ball end cutting edge (3) is set at 0° or a negative angle is equal to or shorter than 0.1 D.

5. The ball end mill according to claim 1, wherein the rake angle γ in the vicinity of the radially outer end (3o) of the ball end cutting edge (3) is set at 0° or a negative angle, and a rake angle γ1 of a peripheral cutting edge (4) connecting to the radially outer end of the ball end cutting edge (3) is set at a positive angle, and thereby a flute (5) along the peripheral cutting edge (4) has a shape of a concavely curved surface in a cross-sectional view at right angle to the axis of the end mill.

6. The ball end mill according to claim 5 wherein, a core thickness (W) of a part excluding a tip and its vicinity is set at 0.2 to 0.5 D, with D being an effective diameter of the end mill, and a length, in the axial direction of the tool, of an area where the rake angle γ in the vicinity of the radially outer end of the ball end cutting edge (3) is set at 0° or a negative angle is equal to or shorter than 0.1 D.

* * * * *

UNITED STATES PATENT AND TRADEMARK OFFICE
CERTIFICATE OF CORRECTION

| | | |
|---|---|---|
| PATENT NO. | : 8,870,498 B2 | |
| APPLICATION NO. | : 13/125916 | |
| DATED | : October 28, 2014 | |
| INVENTOR(S) | : Kazuo Maeda et al. | |

It is certified that error appears in the above-identified patent and that said Letters Patent is hereby corrected as shown below:

In the Claims

Column 7
Claim 1, line 16, delete "end cutting 3", insert --end cutting edge 3--

Signed and Sealed this
Twelfth Day of May, 2015

Michelle K. Lee
*Director of the United States Patent and Trademark Office*